United States Patent
Tochi et al.

(10) Patent No.: US 8,166,815 B2
(45) Date of Patent: May 1, 2012

(54) ANGULAR VELOCITY SENSOR ELEMENT

(75) Inventors: Kenichi Tochi, Tokyo (JP); Takao Noguchi, Tokyo (JP); Ken Unno, Tokyo (JP); Kazuya Maekawa, Tokyo (JP)

(73) Assignee: TDK Corporation, Tokyo (JP)

( * ) Notice: Subject to any disclaimer, the term of this patent is extended or adjusted under 35 U.S.C. 154(b) by 457 days.

(21) Appl. No.: 12/382,274

(22) Filed: Mar. 12, 2009

(65) Prior Publication Data
US 2009/0260436 A1    Oct. 22, 2009

(30) Foreign Application Priority Data
Mar. 28, 2008    (JP) ................................. 2008-085277

(51) Int. Cl.
*G01C 19/56*    (2012.01)
(52) U.S. Cl. .................................................. 73/504.12
(58) Field of Classification Search ................ 73/504.12
See application file for complete search history.

(56) References Cited

U.S. PATENT DOCUMENTS

| | | | |
|---|---|---|---|
| 2003/0066350 A1* | 4/2003 | Machida et al. | 73/504.15 |
| 2004/0187574 A1* | 9/2004 | Hayashi et al. | 73/514.16 |
| 2006/0107740 A1* | 5/2006 | Ogura | 73/504.14 |
| 2006/0150733 A1* | 7/2006 | Ohuchi et al. | 73/504.16 |

FOREIGN PATENT DOCUMENTS
JP    A-11-072334    3/1999

* cited by examiner

*Primary Examiner* — Hezron E Williams
*Assistant Examiner* — Gregory J Redmann
(74) *Attorney, Agent, or Firm* — Oliff & Berridge, PLC

(57) ABSTRACT

An angular velocity sensor element is provided which is capable of preventing even transmission of sudden externally-applied vibration to an element portion by absorbing the vibration. An angular velocity sensor element 2 according to the present embodiment has a fixing portion 21 in the form of a frame, an element portion 20 disposed in the frame of the fixing portion 21 and having vibrating arms 21 to 24 in a drive system and a detection system, and a connecting portion 25 formed as a fixed-fixed beam having its both ends connected to the fixing portion 21 and having its intermediate portion connected to the element portion 20.

4 Claims, 8 Drawing Sheets

ANGULAR VELOCITY SENSOR ELEMENT

BACKGROUND OF THE INVENTION

1. Field of the Invention

The present invention relates to an angular velocity sensor element for detecting the angular velocity of an object.

2. Description of the Related Art

Angular velocity sensor elements have been used in techniques for autonomic control of the attitudes of ships, airplanes, rockets, etc. In recent years, incorporation of angular velocity sensor elements into small electronic appliances such as vehicle navigation systems, digital cameras, video cameras and portable telephones has been put into practice. With the trend, a demand has arisen for further reducing the size and thickness of angular velocity sensors.

On the other hand, making of a vibrating arm of a vibration-type angular velocity sensor is being widely performed by cutting and forming a piezoelectric material by means of machining. Naturally, there is a limit to the accuracy of machining for making such a component. It is, therefore, difficult to meet the above-mentioned demand for further reductions in size and thickness.

A technique to form a vibrating arm by finely working a single crystal thin plate has been proposed with the aim of further reducing the size and thickness of angular velocity sensors. For example, an angular sensor element including an element with a vibrating arm and affixing portion in frame form fixed to the element is disclosed in FIG. 21 of Japanese Patent Laid-Open No. 11-72334.

However, when a sudden impact is applied to such an angular sensor element from the outside, vibration due to this impact is transmitted from the fixing portion to the element portion to be detected as noise through the vibrating arm of the element portion in the detection system.

SUMMARY OF THE INVENTION

In view of the above-described circumstances, an object of the present invention is to provide an angular velocity sensor element capable of preventing even transmission of sudden externally-applied vibration to an element portion by absorbing the vibration.

To achieve the above-described object, according to the present invention, there is provided an angular velocity sensor element including a fixing portion in the form of a frame, an element portion disposed in the frame of the fixing portion and having vibrating arms in a drive system and a detection system, and a connecting portion formed as a fixed-fixed beam having its both ends connected to the fixing portion and having its intermediate portion connected to the element portion.

In this arrangement, when an impact is applied from the outside, the connecting portion in the form of a fixed-fixed beam functions as a vibration absorbing member to damp or filter vibrations due to the impact. That is, of vibrations applied from the outside, only a vibration component corresponding to the vibration frequency of the fixed-fixed beam is transmitted to the element portion through vibration of the fixed-fixed beam. Therefore, only a small part of vibrations from the outside is transmitted to the element portion. If the resonance frequency of the drive system and the detection system in the element portion differ from the vibration frequency of the fixed-fixed beam, any vibration transmitted through the connecting portion does not induce vibrations of the vibrating arms in the drive system and the detection system. Detection of vibration as noise is thus prevented.

Preferably, the width of the connecting portion is smaller than the width of the vibrating arms of the element portion. The resonance frequency is influenced by the width of the beam or the arm. Therefore, if the width of the fixed-fixed beam of the connecting portion is smaller than the width of the vibrating arms in the element portion, the resonance frequency of the vibrating arms in the element portion and the vibration frequency of the fixed-fixed beam of the connecting portion differ from each other and transmission of vibration of the connecting portion to the vibrating arms of the element portion is prevented.

For example, the vibrating arms, the fixing portion and the connecting portion in the element portion are formed integrally with each other. One member is worked to form the element portion and the fixing portion in such a manner, thus achieving a reduction in thickness of the angular velocity sensor element.

Further, to achieve the above-described object, according to the present invention, there is provided an angular velocity sensor element including a fixing portion in the form of a frame, an element portion disposed in the frame of the fixing portion and having vibrating arms in a drive system and a detection system, and a connecting portion formed of a material having an elastic modulus lower than those of materials of the fixing portion and the element portion, the connecting portion connecting the fixing portion and the element portion to each other.

In this arrangement, when an impact is applied from the outside, the connecting portion of a material having an elastic modulus lower than those of materials of the fixing portion and the element portion functions as a vibration absorbing member to absorb vibrations due to the impact. An elastic modulus is obtained as a ratio of strain and force (elastic modulus=force/strain) when an object receives the force and changes. That is, it can be said that if the elastic modulus of an object is low, the object is deformable correspondingly easily under a force. Accordingly, vibration energy from the outside is converted into energy for deformation of the connecting portion to absorb vibration from the outside. As a result, transmission of any vibration to the element portion and detection of the vibration as noise are prevented.

For example, the element portion includes a transmission arm having its both ends fixed to the connecting portions, a drive arm in the form of a fixed-free beam connected to the transmission arm, and a detection arm in the form of a fixed-free beam connected to the transmission arm at a position different from that of the drive arm. Also, for example, the connecting portion is in the form of a fixed-fixed beam perpendicularly extending straight from the transmission arm.

According to the present invention, a connecting portion functioning as a vibration absorbing member is provided between the element portion and the fixing portion. Therefore, even when a sudden vibration is applied from the outside, the vibration can be damped or absorbed by the connecting portion to prevent transmission of the vibration to the element portion.

DETAILED DESCRIPTION OF THE PREFERRED EMBODIMENTS

Figure 1:
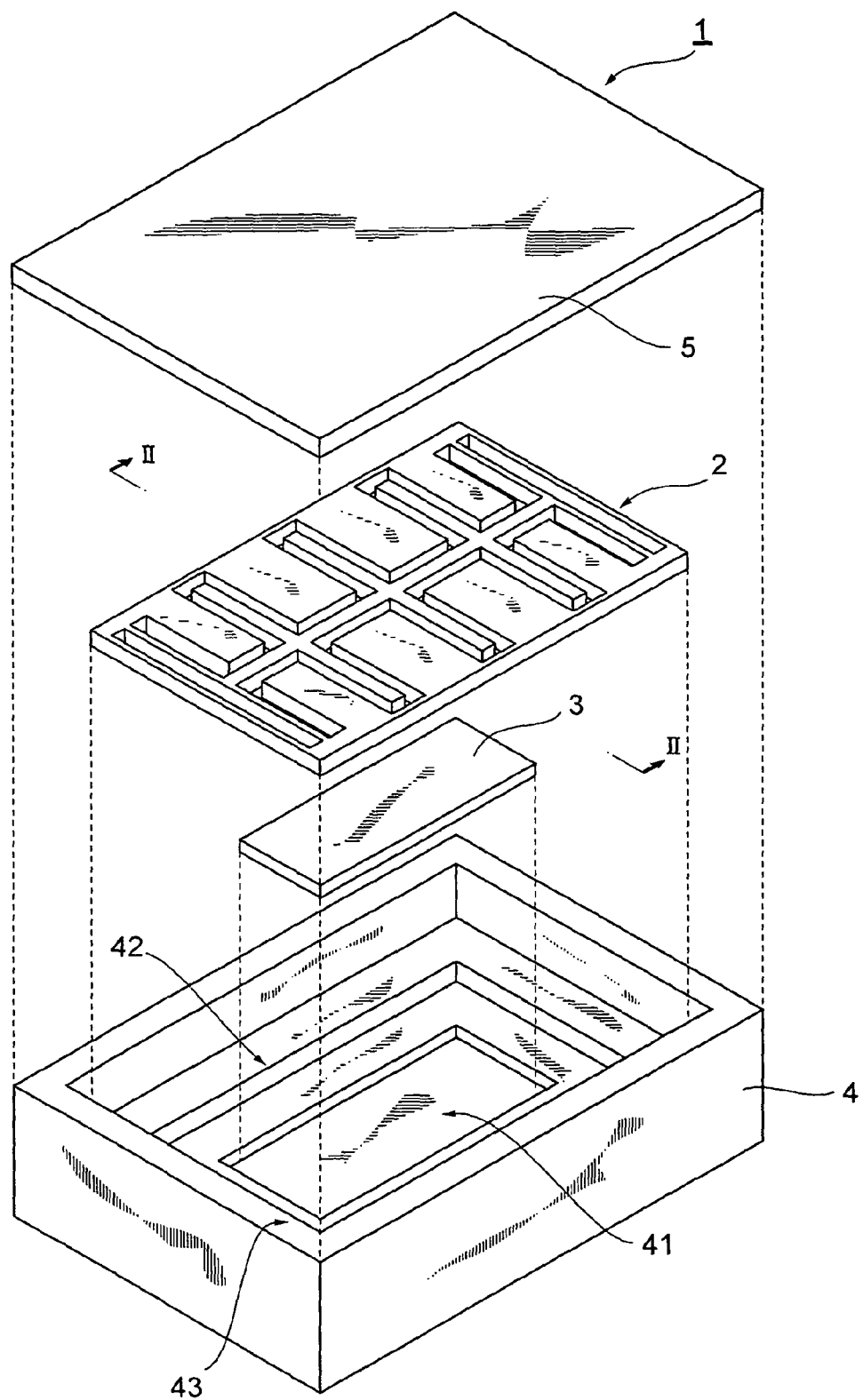
FIG. 1 is an exploded perspective view of an angular velocity sensor device according to a first embodiment of the present invention.

Embodiments of the present invention will be described with reference to the accompanying drawings. Elements identical to each other are indicated by the same reference numerals in the drawings, and redundant description of the identical elements is avoided. Positional relationships such as upper-lower and left-right relationships are based on those shown in the drawings unless otherwise specified. Size proportions are not exclusively specified as shown in the drawings. Embodiments of the present invention described below are meant only examples for illustrating the present invention and are not meant as limiting of the present invention to the embodiments only. Various modifications can be made in the present invention provided that they do not depart from the gist of the invention.

First Embodiment

Figure 2:
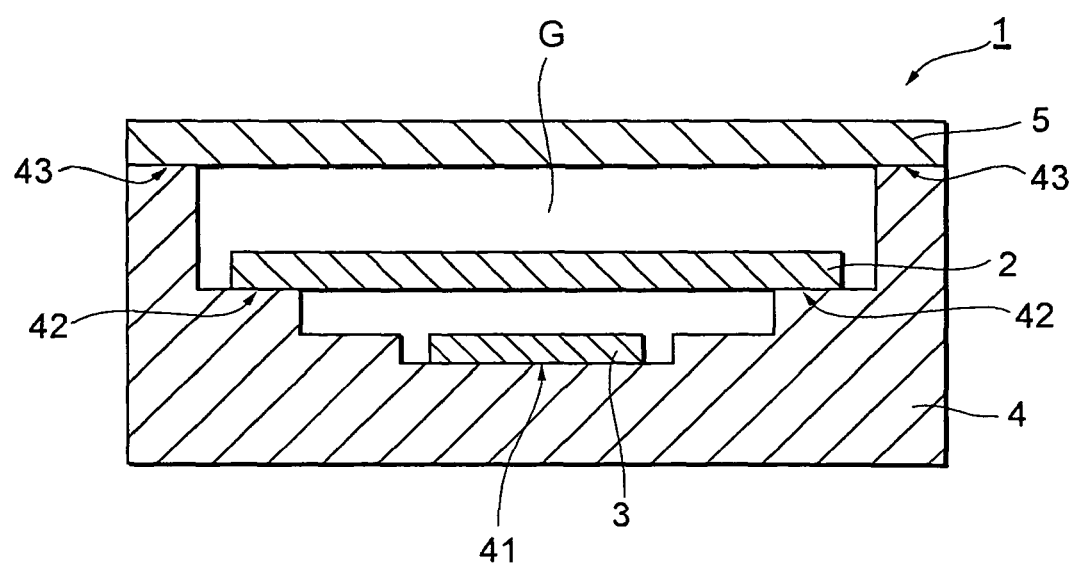
FIG. 2 is a sectional view taken along line II-II in FIG. 1.

FIG. 1 is an exploded perspective view of the internal construction of an angular velocity sensor device 1 according to a first embodiment of the present invention. FIG. 2 is a sectional view taken along line II-II in FIG. 1.

The angular velocity sensor device 1 has an angular velocity sensor element 2 and an integrated circuit element 3 disposed in an internal space G (see FIG. 2) formed by a case 4 and an upper lid 5 superposed on each other.

In the angular velocity sensor element 2, as described above, a drive signal is transmitted to each of piezoelectric elements provided on drive arms of the angular velocity sensor element 2, and a detection signal output from each of piezoelectric elements provided on detection arms of the angular velocity sensor element 2. The case 4 is formed, for example, by stacking a plurality of ceramic thin plates and has a stepped cavity capable of housing the angular velocity sensor element 2 and the integrated circuit element 3. The upper lid 5 is formed, for example, of the same ceramic material as that of the case 4.

As shown in FIG. 1, an annular integrated circuit supporting portion 41 is formed at the deepest position in the cavity of the case 4, and the integrated circuit element 3 is disposed on the integrated circuit supporting portion 41. Also, an annular sensor element supporting portion 42 is formed on the periphery of the integrated circuit supporting portion 41 and at a shallower position relative to the integrated circuit supporting portion 41, and the angular velocity sensor element 2 is disposed on the sensor element supporting portion 42. An annular upper lid supporting portion 43 forming an outer border surrounding the cavity is formed around the sensor element supporting portion 42. The upper lid supporting portion 43 and the upper lid 5 are superposed on each other to enclose the cavity of the case 4 from the outside and form the internal space G (see FIG. 2).

The angular velocity sensor element 2 is formed along a plane parallel to a surface containing the sensor element supporting portion 42 of the case 4, as shown in FIGS. 1 and 2. That is, this angular velocity sensor element 2 is a so-called laterally mounted type of element.

Figure 3:
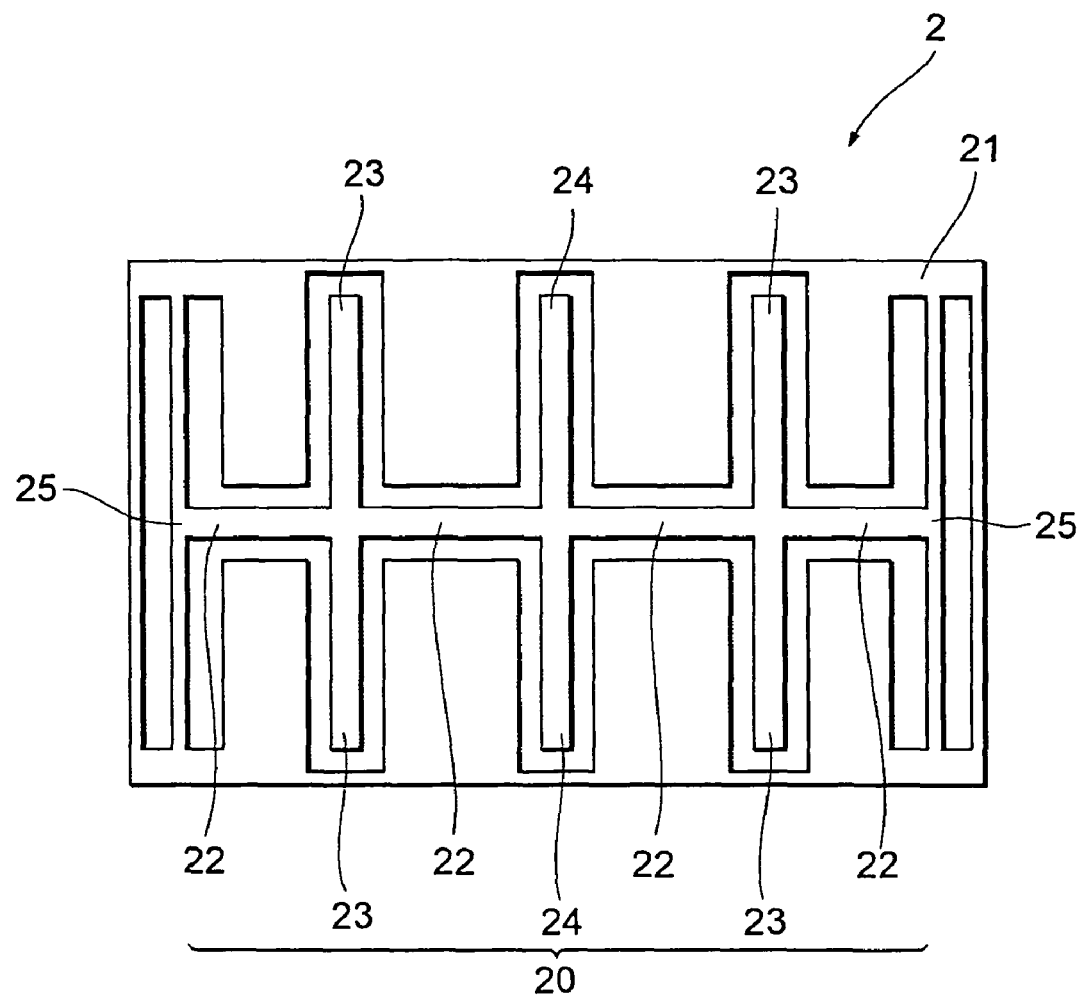
FIG. 3 is a top view showing the construction of an angular velocity sensor element shown in FIG. 1.

FIG. 3 is a plan view showing an example of the upper surface construction of the angular velocity sensor element 2.

The angular velocity sensor element 2 has a fixing portion 21 in the form of a frame, an element portion 20 disposed in the frame of the fixing portion 21 and having a transmission arm 22, drive arms 23 and detection arms 24 (vibrating arms in drive and detection systems), and a pair of connecting arms 25 (connecting portions) disposed on both sides of the element portion 20 to connect the fixing portion 21 and the element portion 20 to each other.

The fixing portion 21 is worked into the shape of a frame with a predetermined clearance (spacing) from the vibrating arms formed of the transmission arm 22, the drive arms 23 and the detection arms 24. A bottom portion of the fixing portion 21 is in contact with an upper surface of the sensor element supporting portion 42 of the case 4. Preferably, at least part of the bottom portion of the fixing portion 21 is fixed to the sensor element supporting portion 42 by an adhesive or the like.

The first objective to be attained by means of the fixing portion 21 is to fix the element portion 20 in the frame of the fixing portion 21 and limit the range of vibration of the vibrating arms formed of the transmission arm 22, the drive arms 23 and the detection arms 24. For this objective, it is preferred that the fixing portion 21 be disposed with a uniform spacing from the transmission arm 22, the drive arms 23 and the detection arms 24. It is also preferred that the fixing portion in the form of a frame and the element portion be formed integrally with each other from one substrate by etching, as shown in FIG. 3.

Each of the connecting arms 25 is formed into the shape of a fixed-fixed beam (clamped-clamped beam) having its both ends connected to the fixing portion 21 and having its intermediate portion connected to the element portion 20. More specifically, each connecting arm 25 is formed of a straight beam which has its both ends connected to the fixing portion 21, and which is connected at an intermediate position to the transmission arm 22. A predetermined clearance is provided between the fixing portion 21 and the connecting arms 25 except at the both ends of the connecting arms 25.

The connecting arms 25 function as a vibration absorbing member for damping or filtering vibrations from the outside. Preferably, the vibration frequency of the connecting arms 25 is set different from the resonance frequency of the vibrating arms (transmission arm 22, drive arms 23 and detection arms 24) of the element portion 20. Further, preferably, the vibration frequency of the connecting arms 25 is set lower than the resonance frequency of the element portion 20, because the sensitivity of the connecting arms 25 to external vibrations can be increased by lowering the resonance frequency to enable absorption of vibrations with improved efficiency. The vibration frequency can be adjusted by changing the width or length of the connecting arms 25. For example, the vibration frequency is reduced if the width of the connecting arms 25 is reduced, and the vibration frequency is reduced if the length of the connecting arms 25 is increased. FIG. 3 shows an example of reducing the width of the connecting arms 25 relative to the width of the vibrating arms of the element portion 20. In ordinary cases, a fixed-free beam (cantilever)

and a fixed-fixed beam have different resonance frequencies even if they are equal in length and width to each other. Therefore, even if the connecting arms 25 is equal in size to the drive arms 23 and the detection arms 24, the vibration frequency of the connecting arms 25 can be set different from the resonance frequency of the drive arms 23 and the detection arms 24.

The transmission arm 22 has its both ends connected to the two connecting arms 25. Therefore, the transmission arm 22 can vibrate in a top-bottom direction (a direction perpendicular to the direction of extension of the transmission arm 22) on its ends functioning as fixed ends, with the connecting arms 25 twisting.

Each drive arm 23 is formed of a fixed-free beam having its one end connected to the transmission arm 22. In the present embodiment, four drive arms 23 in all are connected to the transmission arm 22. Two of the drive arms 23 are connected to one point on the transmission arm 22, while the other two drive arms 23 are connected to another point on the transmission arm 22. The two points on the transmission arm 22 to which the drive arms 23 are connected correspond to two points adjacent to a center point in the case where the length of the transmission arm 22 is divided into four equal parts. The two drive arms 23 extending from the one point or another point on the transmission arm 22 have a line symmetry about a base line corresponding to the transmission arm 22. Thus, each drive arm 23 has its only one end connected to the transmission arm 22 and has its other end as a free end. The drive arm 23 is capable of vibrating the free end in a left-right direction (a direction parallel to the direction of extension of the transmission arm 22).

Each detection arm 24 is formed of a fixed-free beam having its one end connected to the transmission arm 22. In the present embodiment, two detection arms 24 in all are connected to the transmission arm 22. In the present embodiment, the two detection arms 24 are connected to the center point at which the length of the transmission arm 22 is divided into two equal parts. These two detection arms 24 have a line symmetry about a base line corresponding to the transmission arm 22. The detection arm 24 is capable of vibrating the free end in a left-right direction.

The angular velocity sensor element 2 is integrally formed and made of silicon for example. The angular velocity sensor element 2 can be formed at a time, for example, by physically or chemically etching and removing portions of a silicon substrate other than the portion to be left as the angular velocity sensor element 2. The angular velocity sensor element 2 can be formed in this way to meet a demand for reducing the thickness.

Figure 4:
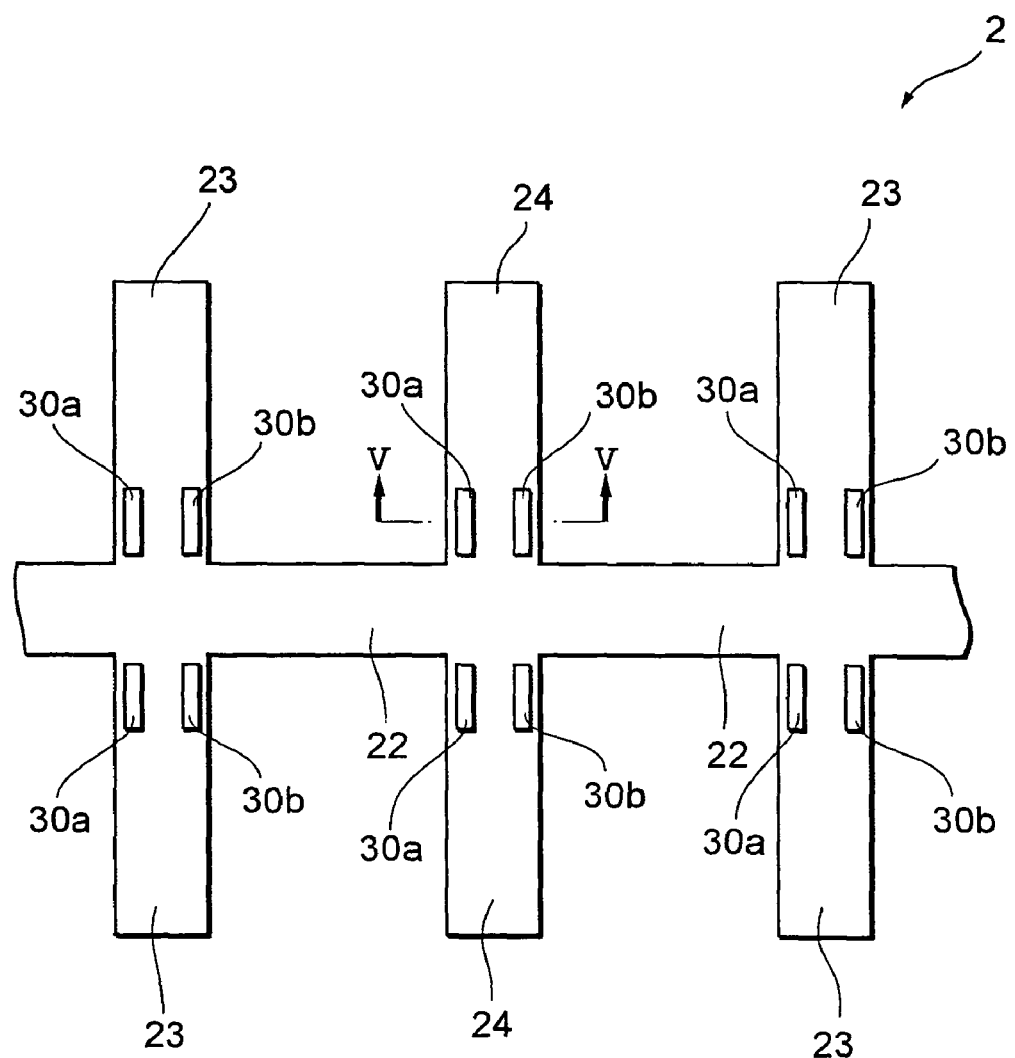
FIG. 4 is an enlarged view of the angular velocity sensor element showing the placement of piezoelectric elements.

A pair of piezoelectric elements are disposed on a surface of each of the drive arms 23 and the detection arms 24. FIG. 4 is a diagram showing an essential portion of the angular velocity sensor element 2 for explanation of the placement of the piezoelectric elements. In FIG. 4, the fixing portion 21 and the connecting arms 25 are omitted.

As shown in FIG. 4, on the surface of each drive arm 23, a pair of piezoelectric elements 30a and 30b whose lengthwise direction is parallel to the direction of extension of the drive arms 23 are formed. The pair of piezoelectric elements 30a and 30b are for vibrating the drive arm 23 along a plane parallel to a plane containing the angular velocity sensor element 2. It is preferred that the pair of piezoelectric elements 30a and 30b be arranged in a direction intersecting the direction of extension of each drive arm 23. It is also preferred that the piezoelectric elements 30a and 30b be disposed at positions at which the amount of deformation of the drive arm 23 is maximized, for example, in the vicinity of a portion of the drive arm 23 connected to the transmission arm 22, as shown in FIG. 4.

Similarly, on the surface of each detection arm 24, a pair of piezoelectric elements 30a and 30b whose lengthwise direction is parallel to the direction of extension of the detection arms 24 are formed. The pair of piezoelectric elements 30a and 30b are for detecting vibrations of the detection arm 24 when the detection arm 24 vibrates along a plane parallel to a plane containing the angular velocity sensor element 2. It is preferred that the pair of piezoelectric elements 30a and 30b be arranged in a direction intersecting the direction of extension of the detection arm 24. It is also preferred that the piezoelectric elements 30a and 30b be disposed at positions at which the amount of deformation of the detection arm 24 is maximized, for example, in the vicinity of a portion of the detection arm 24 connected to the transmission arm 22, as shown in FIG. 4.

Figure 5:
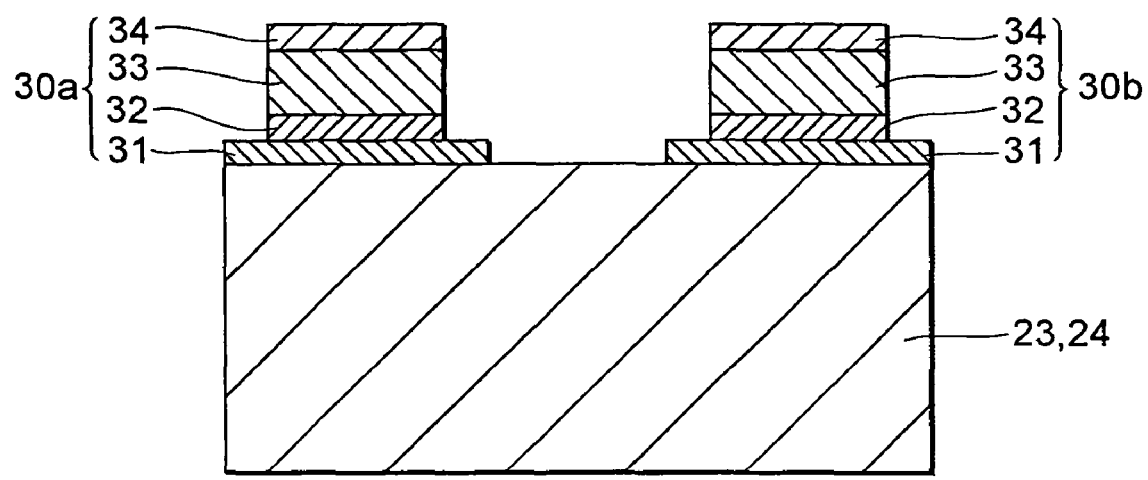
FIG. 5 is a sectional view taken along line V-V in FIG. 4.

FIG. 5 is a sectional view taken along line V-V in FIG. 4.

As shown in FIG. 5, each of the piezoelectric elements 30a and 30b is formed by stacking an insulating layer 31, a lower electrode 32, a piezoelectric member 33 and an upper electrode 34 in this order on the drive arm 23 or detection arm 24. As shown in FIG. 4, the piezoelectric elements 30a and the piezoelectric elements 30b are formed separately from each other.

The insulating layer 31 is formed, for example, by stacking $ZrO_2$ film and $Y_2O_3$ film in this order. The lower electrode 32 is formed, for example, of a Pt(100) alignment layer. The piezoelectric member 33 is formed, for example, by containing lead zirconium titanate (PZT). The upper electrode 34 is formed, for example, of a Pt(100) alignment layer.

Figure 6:
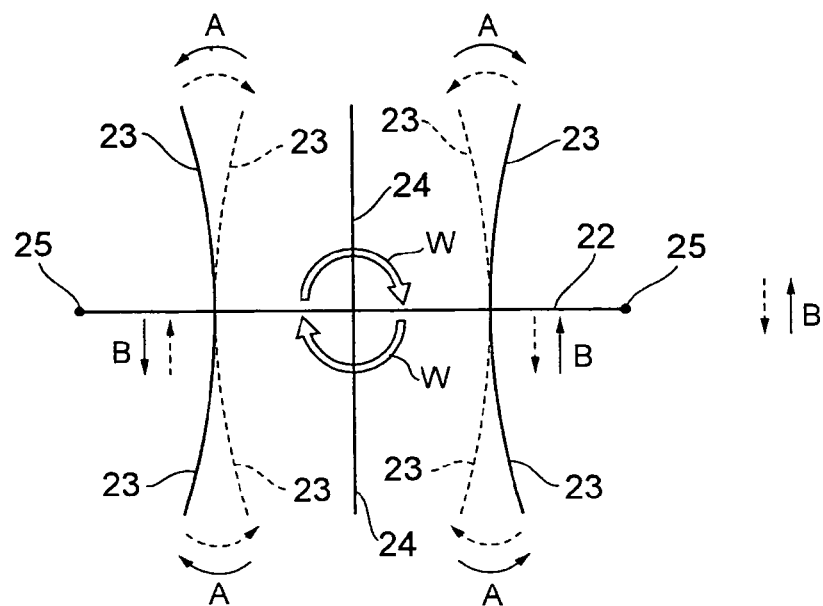
FIG. 6 is a diagram showing drive vibration of drive arms 23.
Figure 7:
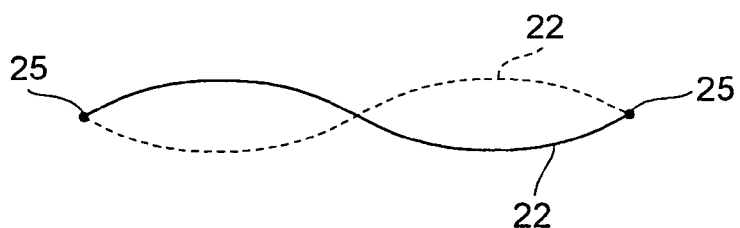
FIG. 7 is a diagram showing bending vibration of transmission arm 22.
Figure 8:
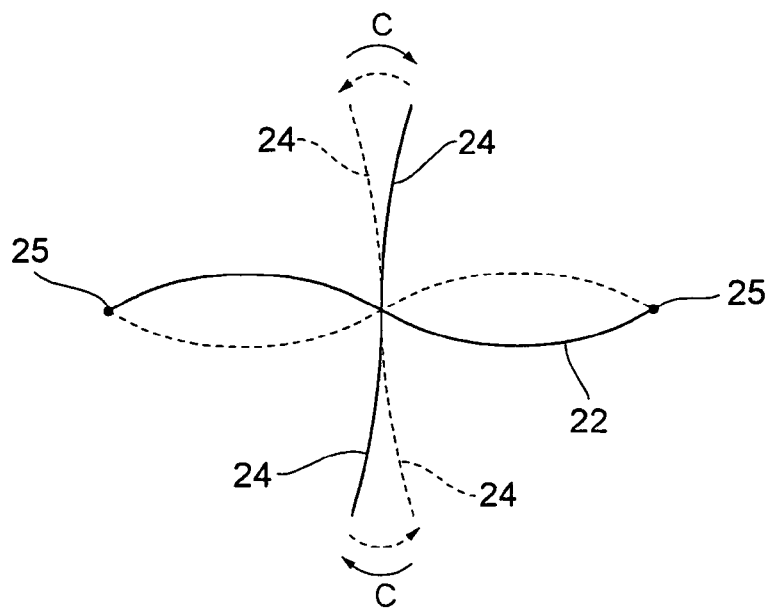
FIG. 8 is a diagram showing detection vibration of detection arms 24.

The operation of the angular velocity sensor element 2 will next be described. FIGS. 6 to 8 are plan views schematically showing the actions of the transmission arm 22, the drive arms 23 and the detection arms 24. In FIGS. 6 to 8, each vibrating arm is simply expressed in the form of a line for ease of expression of the form of vibration. Also, the vibrating arms unnecessary for description is omitted with respect to each action.

FIG. 6 is a diagram for explaining drive vibration. Drive vibration is bending vibration of the drive arms 23 indicated by arrows A. In drive vibration, a vibration attitude indicated by the solid line and a vibration attitude indicated by the broken line recur at a predetermined frequency. In this vibration, on both sides of each of the two detection arms 24, the pair of drive arms 23 vibrate symmetrically with respect to a center line corresponding to the detection arm 24, so that the transmission arm 22 and the detection arms 24 do not vibrate substantially.

When a rotational angular velocity $\omega$ with respect to an axis of rotation corresponding to a direction perpendicular to a plane containing the angular velocity sensor element 2 is applied in the state where the drive arms 23 are in drive vibration shown in FIG. 6, Coriolis forces indicated by arrows B act on the drive arms 23. The Coriolis forces act in opposite directions on the pair of drive arms 23 on the both side of the base line corresponding to the detection arm 24.

As a result, S-bending vibration of the transmission arm 22 is induced, as shown in FIG. 7. The bending vibration of the transmission arm 22 is vibration having nodes corresponding to the center and both ends of the transmission arm 22 and loops corresponding to the connections of the drive arms 23.

When this bending vibration of the transmission arm 22 is transmitted, detection vibrations of the detection arms 24 are induced, as shown in FIG. 8. The detection vibrations of the detection arms 24 are bending vibrations indicated by arrows C and having recurrence of a vibration attitude indicated by the solid line and a vibration attitude indicated by the broken line. Detection signals according to the vibrations of the detection arms 24 are taken out from the piezoelectric elements 30a and 30b, thereby detecting the rotational angular velocity.

When an impact is applied to the angular velocity sensor element 2 from the outside, vibration caused by this impact is transmitted to the connecting arms 25 through the fixing portion 21. In the present embodiment, each connecting arm 25 in the form of a fixed-fixed beam functions as a vibration absorbing member to damp or filter vibrations transmitted from the fixing portion 21 to the element portion 20. That is, of vibrations applied from the outside, only a vibration component corresponding to the vibration frequency of the connecting arms 25 is transmitted to the element portion 20 through vibrations of the connecting arms 25. Therefore, only a small part of vibrations from the outside is transmitted to the element portion 20. If the vibration frequency of the drive arms 23 and the detection arms 24 in the element portion 20 differ from the resonance frequency of the connecting arms 25 in the form of fixed-fixed beams, any vibration transmitted through the connecting arms 25 does not induce vibrations of the drive arms 23 and the detection arms 24. Detection of vibration as noise is thus prevented.

In the angular velocity sensor element 2 according to the present embodiment, as described above, vibration due to an impact from the outside is absorbed by the connecting arms 25 in the above-described action, thus achieving prevention of vibration of the detection arms 24 due to external vibration. Consequently, vibration from the outside as noise can be prevented from being detected as noise and the accuracy of the angular velocity sensor element 2 can be improved.

It is preferable to reduce the width of the connecting arms 25 relative to the vibrating arms of the element portion 20, particularly the width of the detection arms 24. The resonance frequency of the detection arms 24 and the vibration frequency of the connecting arms 25 can be made significantly different from each other. As a result, even if the connecting arms 25 vibrate when damping or absorbing vibration from the outside, no vibrations of the detection arms 24 of the element portion 20 are induced by this vibration of the connecting arms 25.

Second Embodiment

Figure 9:
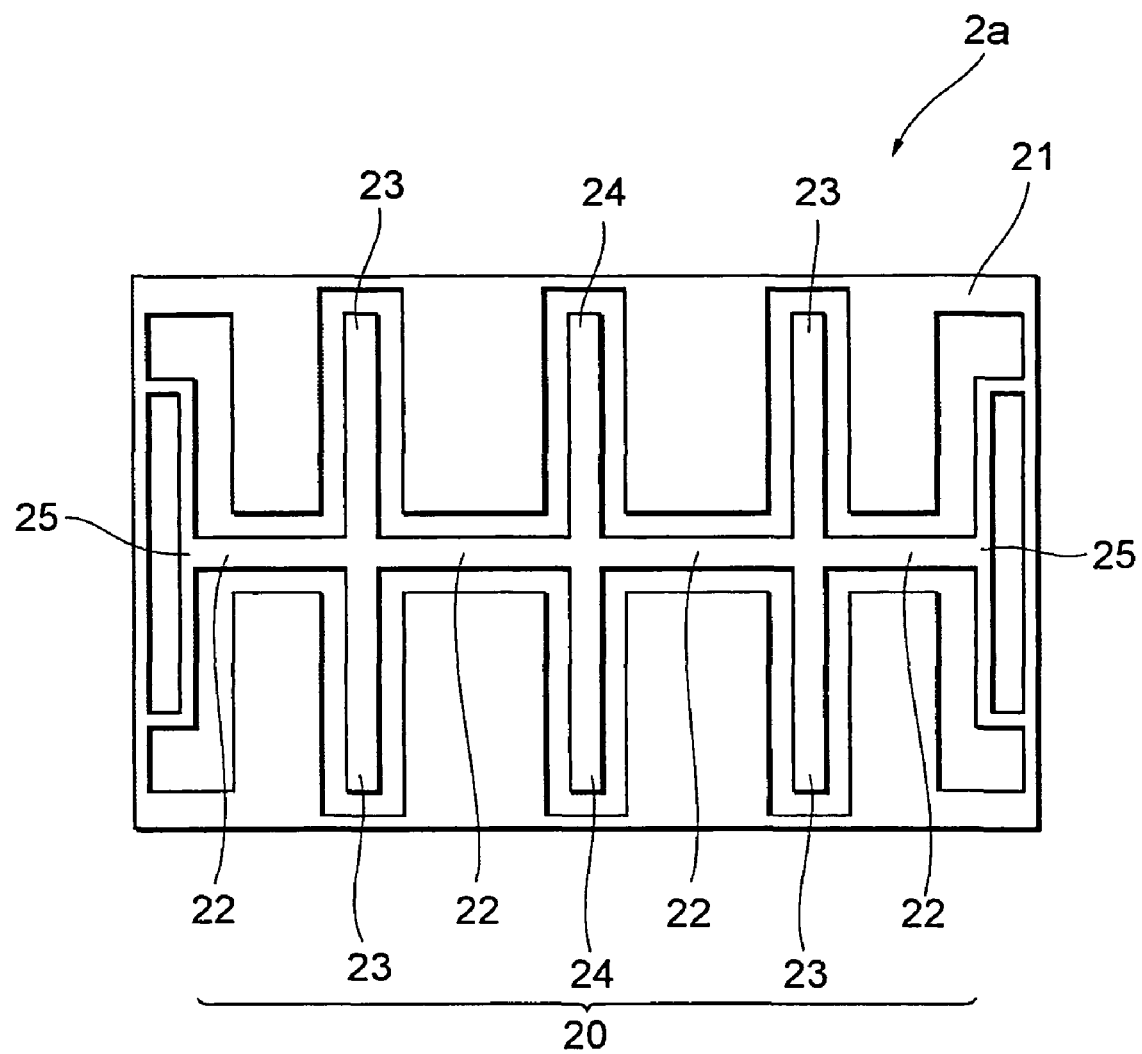
FIG. 9 is a top view showing the construction of an angular velocity sensor element 2a according to a second embodiment of the present invention.

An angular velocity sensor element 2 according to a second embodiment of the present invention is the same as that according to the first embodiment except for the shape of the connecting arms 25. FIG. 9 is a top view of the construction of an angular velocity sensor element 2a according to the second embodiment.

In the present embodiment, as shown in FIG. 9, the connecting arms 25 has such a structure as to be bent between the transmission arm 22 and the fixing portion 21. With such connecting arms 25, sudden vibration from the outside can be damped or absorbed in the same way as in the first embodiment to prevent transmission of any vibration to the element portion.

Third Embodiment

Figure 10:
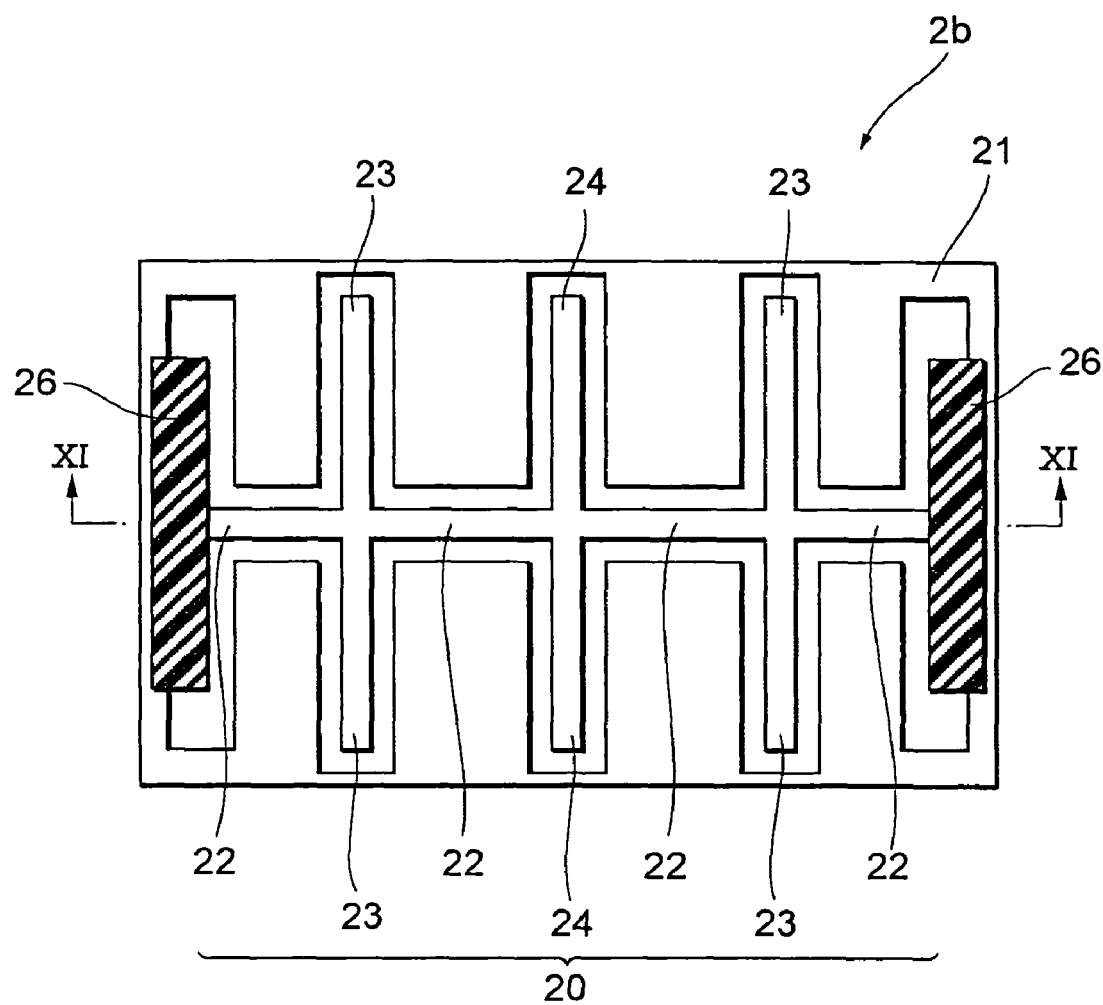
FIG. 10 is a top view showing the construction of an angular velocity sensor element 2b according to a third embodiment of the present invention.
Figure 11:
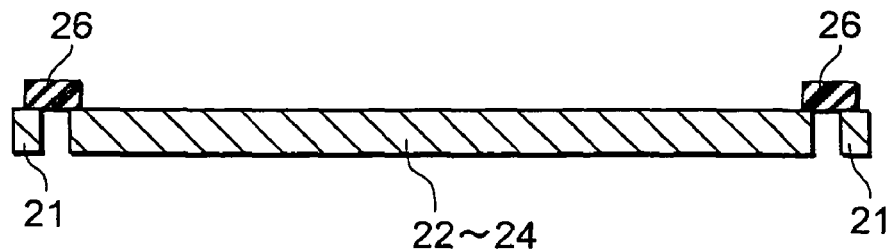
FIG. 11 is a sectional view taken along line XI-XI in FIG. 10.

An angular velocity sensor element 2b according to a third embodiment of the present invention is the same as that according to the first embodiment except that an adhesive 26 formed of a material different from the material of the fixing portion 21 and the element portion 20 is used in place of the connecting arms 25. FIG. 10 is a top view of the construction of the angular velocity sensor element 2b according to the third embodiment. FIG. 11 is a sectional view taken along line XI-XI in FIG. 10.

As shown in FIG. 10, the adhesive (connecting portion) 26 for bonding the fixing portion 21 and the transmission arm 22 to each other is provided between the fixing portion 21 and the transmission arm 22. As the adhesive 26, a material having an elastic modulus lower than that of the material of the fixing portion 21 and the element portion 20 is used. The material of the adhesive 26 may be any of insulating resins and metals such as solder if it satisfies the elastic modulus condition. Wiring conductors (not shown) connected to the piezoelectric elements are formed on the fixing portion 21 and the transmission arm 22. In a case where a metal is used as adhesive 26, therefore, it is preferable to form the metal after forming an insulating film with which the wiring conductors are covered. In a case where a resin is used as adhesive 26, an epoxy resin, a polyimide resin, a phenolic resin, an unsaturated polyester resin, a urea resin, a melamine resin or a diallyl phthalate resin for example can be preferably used. In a case where a metallic material is used as adhesive 26, a material containing one of or two or more of tin, silver, gold, lead, zinc, aluminum, cadmium and solder (tin-zinc alloy) can be preferably used. A solder material is particularly preferred.

As shown in FIG. 11, the fixing portion 21 and the transmission arm 22 are formed separately from each other unlike those in the first embodiment. FIG. 11 shows an example in which the adhesive 26 is formed on only one side of the angular velocity sensor element 2. This structure is formed by forming the adhesive 26 at predetermined positions on one side of a silicon substrate and by thereafter performing etching on the other side of the silicon substrate so that the substrate is formed into the shapes of the element portion 20 and the fixing portion 21. The adhesive 26 may be formed so as to fill the regions between the fixing portion 21 and the transmission arm 22 in FIG. 11.

Since the adhesive 26 is formed of a material having an elastic modulus lower than that of the material of the fixing portion 21 and the element portion 20, it functions as a vibration absorbing member which absorbs vibrations applied from the outside. An elastic modulus is obtained as a ratio of strain and force (elastic modulus=force/strain) when an object receives the force and changes. That is, it can be said that if the elastic modulus of an object is low, the object is deformable correspondingly easily under a force. Accordingly, vibration energy from the outside is converted into energy for deformation of the adhesive 26 to absorb vibration from the outside. As a result, transmission of any vibration to the element portion 20 and detection of the vibration as noise are prevented.

In the angular velocity sensor element 2b according to the third embodiment, as described above, vibration caused by an impact from the outside is absorbed by the adhesive 26 in the above-described action. Therefore, vibration of the detection arms 24 due to the external vibration can be prevented. Thus, vibration from the outside can be prevented from being detected as noise and the accuracy of the angular velocity sensor element 2b can be improved.

As mentioned above, the present invention is not limited to the above-described embodiments. Various modifications can be made in the present invention provided that they do not depart from the gist of the invention. For example, there are no restrictions on the placement and the shapes of the transmission arm 22, the drive arms 23 and the detection arms 24 constituting the element portion 20, and there are no restrictions on the principle of detection of the angular velocity.

Also, there are no restrictions on the placement and the configuration of piezoelectric elements on the drive arms 23 and the detection arms 24.

The angular sensor element of the present invention can be mounted in any devices and appliances requiring angular velocity detection and can be used for detection of camera shake of a video camera, detection of an action in a virtual reality apparatus and detection of a bearing in a vehicle navigation system.

What is claimed is:

1. An angular velocity sensor element comprising:
   a transmission arm extending straight in a first direction;
   vibrating arms in a drive system and a detection system, the vibration arms connected to a region between both ends of the transmission arm;
   connecting arms extending in a direction perpendicular to the first direction and connected to the ends of the transmission arm; and
   a fixing portion in the form of a frame arranged outside of the transmission arm, the vibrating arms, and the connecting arms,
   wherein both ends of respective connecting arms are connected to the fixing portion.

2. The angular velocity sensor element according to claim 1, wherein a width of the connecting arms is smaller than a width of the vibrating arms.

3. The angular velocity sensor element according to claim 1, wherein the vibrating arms, the fixing portion and the connecting arms are formed integrally with each other.

4. The angular velocity sensor element according to claim 1, wherein the vibrating arms include:
   a drive arm in the form of a fixed-free beam connected to the transmission arm; and
   a detection arm in the form of a fixed-free beam connected to the transmission arm at a position different from that of the drive arm.

* * * * *